United States Patent
Safer et al.

[11] 3,887,866
[45] June 3, 1975

[54] SURGE TESTER FOR TESTING AN ELECTRICAL WINDING AND INCLUDING VOLTAGE COMPARISON MEANS

[75] Inventors: Michael B. Safer, Shaker Heights; Andrew J. Menegos, Copley, both of Ohio

[73] Assignee: Avtron Manufacturing, Inc., Cleveland, Ohio

[22] Filed: Sept. 20, 1974

[21] Appl. No.: 567,675

Related U.S. Application Data

[62] Division of Ser. No. 368,306, June 8, 1973.

[52] U.S. Cl. ................................. 324/51; 324/54
[51] Int. Cl. ..................... G01r 31/02; G01r 31/06
[58] Field of Search ................ 324/51, 52, 55, 133

[56] References Cited
UNITED STATES PATENTS

| | | | |
|---|---|---|---|
| 2,578,499 | 12/1951 | Bauer | 324/54 |
| 3,045,177 | 7/1962 | Weed | 324/54 |
| 3,328,683 | 6/1967 | Davenport et al. | 324/55 X |
| 3,510,763 | 5/1970 | Clinton | 324/54 |
| 3,546,581 | 12/1970 | Herrendeen et al. | 324/54 |
| 3,548,302 | 12/1970 | Arnold et al. | 324/54 |
| 3,611,122 | 10/1971 | Pahl | 324/54 |
| 3,617,879 | 11/1971 | Mugnier | 324/133 X |
| 3,649,913 | 3/1972 | Flieder et al. | 324/133 |

*Primary Examiner*—Gerard R. Strecker

[57] ABSTRACT

A surge tester simultaneously applies oppositely polarized surge pulses to a test winding and a standard winding. If there is an unbalance in the electrical characteristics of the two windings, a difference voltage representative of the difference in the voltages developed across the windings is applied to a fault detecting circuit. If the unbalance is sufficiently great, a fault indication is provided. A fault indicator circuit includes an electronic control device arranged so that it can be gated into a conductive condition in response to a fault condition only during half cycles of line voltage of one polarity and the surge pulses are applied to the windings only during half cycles of the opposite polarity. The magnitude of the difference voltage, representative of an unbalance condition, is compared against a reference voltage which varies in accordance with fluctuations in the line voltage. A ground fault condition is represented by an oscillatory voltage and this is detected by providing a fault indication only if the number of pulsations of the oscillatory voltage attains a given pulse count within a given period of time.

6 Claims, 5 Drawing Figures

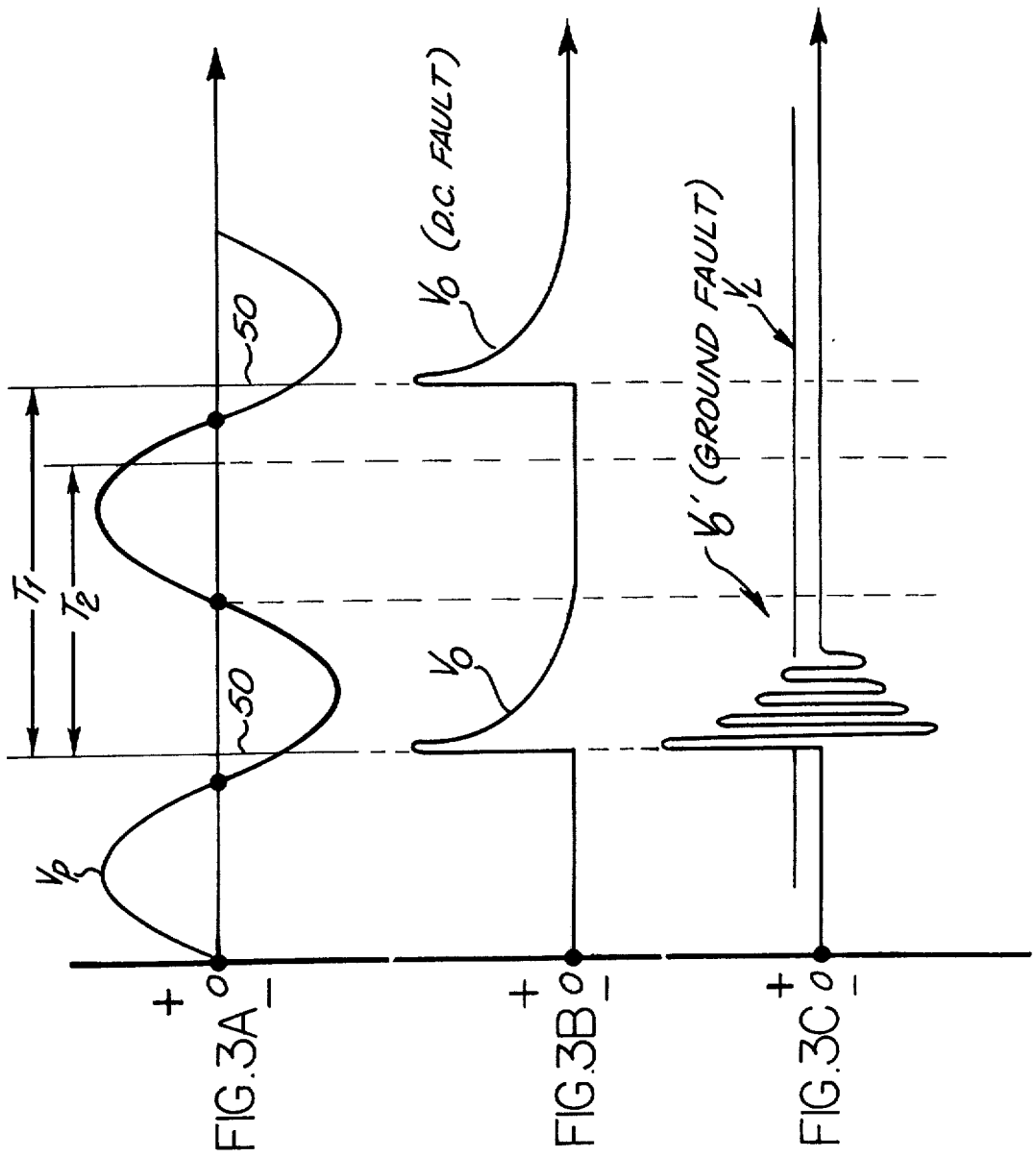

SURGE TESTER FOR TESTING AN ELECTRICAL WINDING AND INCLUDING VOLTAGE COMPARISON MEANS

This is a division, of application Ser. No. 368,306 filed June 8, 1973.

This invention relates to the art of electrical testing and, more particularly, to an improved surge tester for testing an electrical winding for fault conditions wherein a surge voltage pulse, exhibiting a fast rise time and short duration, is applied to the winding under test.

The invention is particularly applicable for use in testing inductors, motor windings, and the like for ground faults and breakdowns as well as internal faults such as shorted turns and incorrect wire size or wrong connections in stators, armatures, solenoids, and other windings. Also, the surge tester, in accordance with the invention, precipitates breakdowns caused by incipient faults to detect conditions which might result in premature failures.

Surge testers are known in the art and one such tester takes the form as illustrated and described in U.S. Pat. No. 3,328,683 which is assigned to the assignee of the present invention and which patent is herein incorporated by reference. That patent discloses a surge comparison circuit wherein surge voltage pulses of equal magnitude and opposite polarity are simultaneously applied to a standard winding and a test winding which are connected together in series. Each surge voltage pulse is obtained by charging a capacitor to a high potential and then discharging the capacitor into an associated winding. The applied surge voltage pulse has a fast rise time on the order of 0.05 microseconds producing a great turn-to-turn stress. Any unbalance taking place between the test and standard windings appears as a difference voltage at a common point between the two windings. This difference voltage is then compared with a preset limit, and if the difference voltage exceeds the limit, a no-go indication is provided. Consequently, the surge tester is applicable for use in production line testing of windings and the like.

The present invention is directed toward improvements particularly applicable for use in a surge tester of the type described hereinbefore. It is desirable in such a surge tester that detection of an unbalance condition be made so that it is not affected by noise generated in the circuitry due to application of a surge voltage pulse. This may be done by synchronizing the operation of the circuitry so that the surge voltage pulse is applied during one half cycle of a given polarity of an AC line voltage source and that a fault indication circuit be triggered only during half cycles of the opposite polarity when surge voltage pulses are not being applied to the windings.

The surge voltage pulse may be derived by charging a capacitor through a step up transformer connected to a source of AC line voltage. The magnitude of the surge voltage pulse will vary in dependence upon fluctuations in the line voltage source. The difference voltage, taken at the junction of the series connected standard and test winding, will also vary with line voltage. Consequently then, it is desirable that a detector circuit for comparing the difference voltage with a reference voltage be provided with a reference voltage that also varies similarly in magnitude with fluctuations in the AC line voltage.

A ground fault may be defined as an existing or impending electrical connection existing between a winding and an associated electrically conductive core. Such ground faults have been detected by connecting the core member to an electrical reference node, such as ground, and connecting a capacitor between the winding and the electrical reference node. If a surge voltage pulse is then applied to the winding, the response across the winding is an oscillatory voltage created by the LC resonant circuit of the capacitor and the portion of the winding in parallel with it. This ground fault voltage is a damped oscillation which is symetrical about zero voltage. The nature of the oscillatory voltage is difficult to examine since its DC signal level is essentially that of the reference potential.

It is, therefore, an object of the present invention to provide an improved surge tester incorporating circuitry whereby application of a surge voltage pulse will not result in an erroneous fault indication of an unbalance condition.

It is a still further object of the present invention to provide an improved fault detector circuit in a surge tester wherein the reference voltage, against which an unbalanced difference voltage is compared, varies with fluctuations in line voltage.

It is a still further object of the present invention to provide circuitry for detecting a ground fault condition and providing a no-go type indication in the event the ground fault exhibits sufficient unwanted characteristics.

In accordance with one aspect of the present invention, the surge tester employs circuitry for simultaneously applying first and second surge voltages of equal magnitude and opposite polarity to a test winding and to a standard winding. Circuitry is connected to the windings to obtain therefrom a difference voltage, which exhibits a magnitude representative of the difference in the voltages developed across the windings in response to application of surge voltages thereto. The surge voltages are applied to the windings in synchronizism with half cycles of one polarity of an alternating voltage source. The detector circuit provides a turn on signal representative of an unwanted unbalance in the electrical characteristics of the windings in dependence upon the magnitude of the difference voltage. A fault indicator circuit is provided with an electronic control device which exhibits the characteristic of being gated into a conductive condition only upon receipt of a turn on signal at a point in time that the potential applied to a first electrode is more positive than that applied to a second electrode thereof. The electrodes are connected to the AC voltage source in such a manner that the control device will be turned on by a turn on signal only during half cycles of a polarity opposite from that during which the surge voltage pulses are applied.

In accordance with a still further aspect of the present invention, the surge tester employs a surge voltage generator including a pair of capacitors which are charged from an unregulated AC line voltage source so the voltage will vary with fluctuations in line voltage. The capacitors are simultaneously discharged through first and second switching means so as to respectively apply first and second surge voltages to a test winding and to a standard winding. Circuitry is connected to the windings to obtain therefrom a difference voltage exhibiting a magnitude representative of the difference in the voltages developed across the standard and test windings in response to application of the first and second surge voltages. A detector circuit compares the difference voltage with a reference voltage which varies with the line voltage and, hence, in proportion to the applied surge voltages, and an output fault signal is provided in dependence upon this comparison.

In accordance with a still further aspect of the present invention, a winding is surge tested to determine an existing or impending ground fault by virtue of an electrical connection existing while a surge voltage is applied to the winding and an associated electrically conductive core. In this aspect of the invention, a capacitor is connected between the winding and the core. A fast rising voltage pulse is then applied to the winding so that is a ground fault exists, a damped oscillatory voltage appears across the capacitor. A ground fault detector responds to the oscillatory voltage and provides an output indication representative of a ground fault as a function of the number of pulsations of the oscillatory voltage signal during a given period of time.

The foregoing and other objects and advantages of the invention will become more readily apparent from the following description of the preferred embodiment of the invention as taken in conjunction with the accompanying drawings which are a part hereof and wherein:

FIGS. 3a, 3b, and 3c are waveforms of voltage with respect to time, illustrating the operation of various aspects of the present invention.

Figure 1:
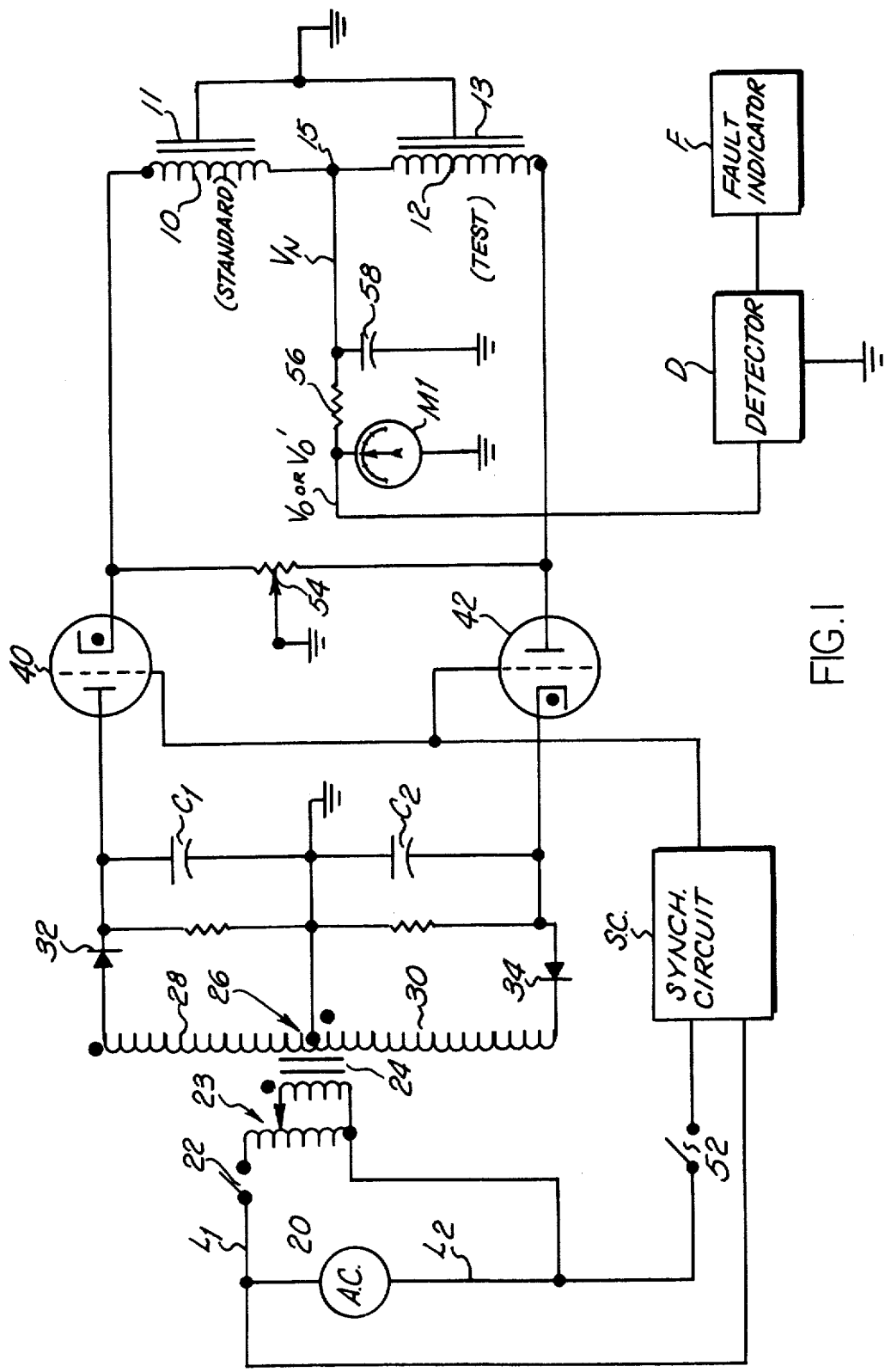
FIG. 1 is a schematic illustration of a surge tester incorporating the present invention.

Referring now to the drawings wherein the showings are for purposes of illustrating a preferred embodiment of the invention only and not for purposes of limiting same; there is shown a surge tester incorporating the present invention. The surge tester, as illustrated in FIG. 1, operates on a comparison principal. Equal but opposite surge voltage pulses are simultaneously applied to a standard winding 10 and a test winding 12 which are connected together in series. The surge voltages impose a high turn-to-turn stress on the windings. Any unbalance in the electrical characteristics of windings 10 and 12 results in a difference voltage $V_n$, taken between a reference node and the junction of the two windings. Voltage $V_n$ is of a magnitude proportional to the instantaneous difference in the voltages obtained across the two windings in response to application of the surge voltages thereto. The difference voltage has a DC component of either positive or negative polarity, depending on the type of fault and which winding is faulted, and exhibits a sharp rise with an exponential fall. This signal is applied to an improved detector circuit D which operates an improved fault indicator F. The remaining circuitry illustrated in FIG. 1 is based on that shown in the aforesaid U.S. Pat. No. 3,328,683 to which reference should be made for more detailed understanding of the circuitry. A brief description of the circuitry in FIG. 1 is presented below.

The surge generator portion of the surge tester serves to generate the surge voltages which are preferably derived from an AC line voltage source 20. Upon closure of a suitable switch, represented by the simple normally open switch 22 herein, the AC line voltage, taken between lines $L_1$ and $L_2$, is applied to a suitable variable autotransformer 23. The output of autotransformer 23 is applied to a transformer 24 having a center tapped secondary winding 26. The electrical mid-point of secondary winding 26 is connected to a reference node, shown as ground, defining an upper winding portion 28 and a lower winding portion 30. The step up action of the transformer is sufficient to raise the voltage to an exceedingly high level, such as on the order of 4 kilovolts peak, as seen across each of the winding portions 28 and 30. The upper winding portion 28 is connected in parallel with a surge capacitor $C_1$ through a diode 32, polarized as shown. Similarly, the lower winding portion 30 is connected in parallel with a surge capacitor $C_2$ through a diode 34, polarized as shown. Consequently, capacitors $C_1$ and $C_2$ are charged through diodes 32 and 34 during each positive half cycle of the alternating voltage source. The capacitors are of equal magnitude and the components in the respective charging circuits are matched so that the capacitors will charge to equal but opposite peak voltage magnitudes which will be a multiple, by the turns ratio the transformer, of the peak voltage $V_p$ of the alternating current voltage source. The diodes will prevent the capacitors from discharging to a value less than that corresponding to the peak voltage.

As capacitors $C_1$ and $C_2$ are being charged during the positive half cycle of the voltage source, they are prevented from being discharged in the forward direction into the standard winding 10 and the test winding 12 by normally open switches located in the discharge circuits. The normally open switches are illustrated in FIG. 1 as being thyratrons 40 and 42 which serve to pass the short duration, high voltage surge pulses when triggered into conduction by a synchronizing circuit SC. It is to be appreciated, however, that triggered electronic components, other than thyratrons, may be employed for this purpose and such other components may, for example, take the form of silicon controlled rectifiers. The thyratrons 40 and 42 are triggered into conduction in a known manner under the control of a synchronizing circuit SC, which may take the form as that described in U.S. Pat. No. 3,328,683 so that the thyratrons are simultaneously triggered into conduction in synchronism with the negative half cycles of the alternating current voltage source. The point of firing the thyratrons is illustrated in the waveform of FIG. 3a as point 50 during each negative half cycle of the AC line voltage. The synchronizing circuit may be activated upon closure of a switching means, represented herein by a simple normally open switch 52. A null adjustment potentiometer 54 is connected across the discharge sides of thyratrons 40 and 42 to manually adjust for small variations in the test and reference winding characteristics as well as to provide a discharge circuit for the surge capacitors in the event that one of the windings is open circuited. A DC meter $M_1$ connected between ground and the junction of windings 10 and 12 through a resistor 56 may be used to facilitate the null setting of potentiometer 54.

In operation, the capacitors $C_1$ and $C_2$ are charged during the positive half cycles of the alternating current voltage source and are simultaneously discharged through thyratrons 40 and 42 during the negative half cycles to apply the surge voltage pulses to the standard winding 10 and the test winding 12. As described in U.S. Pat. No. 3,328,683, various timing circuits may be employed for purposes of controlling the time duration of a surge test so that, for example, a test may be conducted over a one second interval with the surge pulses being applied sixty times per second or in accordance with line frequency. Also, suitable timing may be employed for delaying the test operation until heating circuits have had sufficient time to heat the heating elements normally employed with the thyratrons 40 and 42. These and other features are described in greater detail in the aforesaid patent.

If there is an unbalance in the electrical characteristics of the standard and test windings, this will result in a difference voltage, $V_n$, taken between the mid-point of the series connected windings and the reference node with the waveform of the voltage appearing substantially as that shown in FIG. 3$b$. The difference voltage has a sharp rise, corresponding with the sharp rise of the applied surge voltage, and an exponential fall. The difference voltage may be of positive or negative polarity depending upon the type of fault and which winding is faulted. This type of signal is caused by normal winding unbalance wuch as shorted turns, overwound turns, underwound turns, or an open circuit. Thus, there is a DC component in the signal fault which causes a deflection of the balance meter $M_1$ connected to the summing junction of the windings. The balance meter will average the difference voltage and present an indication of the magnitude and polarity of the fault.

In accordance with the present invention, the DC fault signal $V_n$ is applied to the detector circuit D where the signal is compared against upper and lower limits to determine whether the magnitude of the DC fault signal is within an acceptable range. If not, then a no-go fault indication is provided. Referring now to the circuitry of FIG. 2, the DC fault signal $V_0$ is applied to a two pole active, low pass, inverting filter 70 of known design and which may exhibit a corner frequency of 3 Hz and a DC gain of 1. Consequently, an average DC steady state signal $V_1$ is provided which is of a magnitude accurately representative of the average value of the DC fault signal. The output signal $V_1$ from the filter 70 is then applied to a window comparator WC which serves to determine whether the magnitude of the voltage is within an acceptable range.

Figure 2:
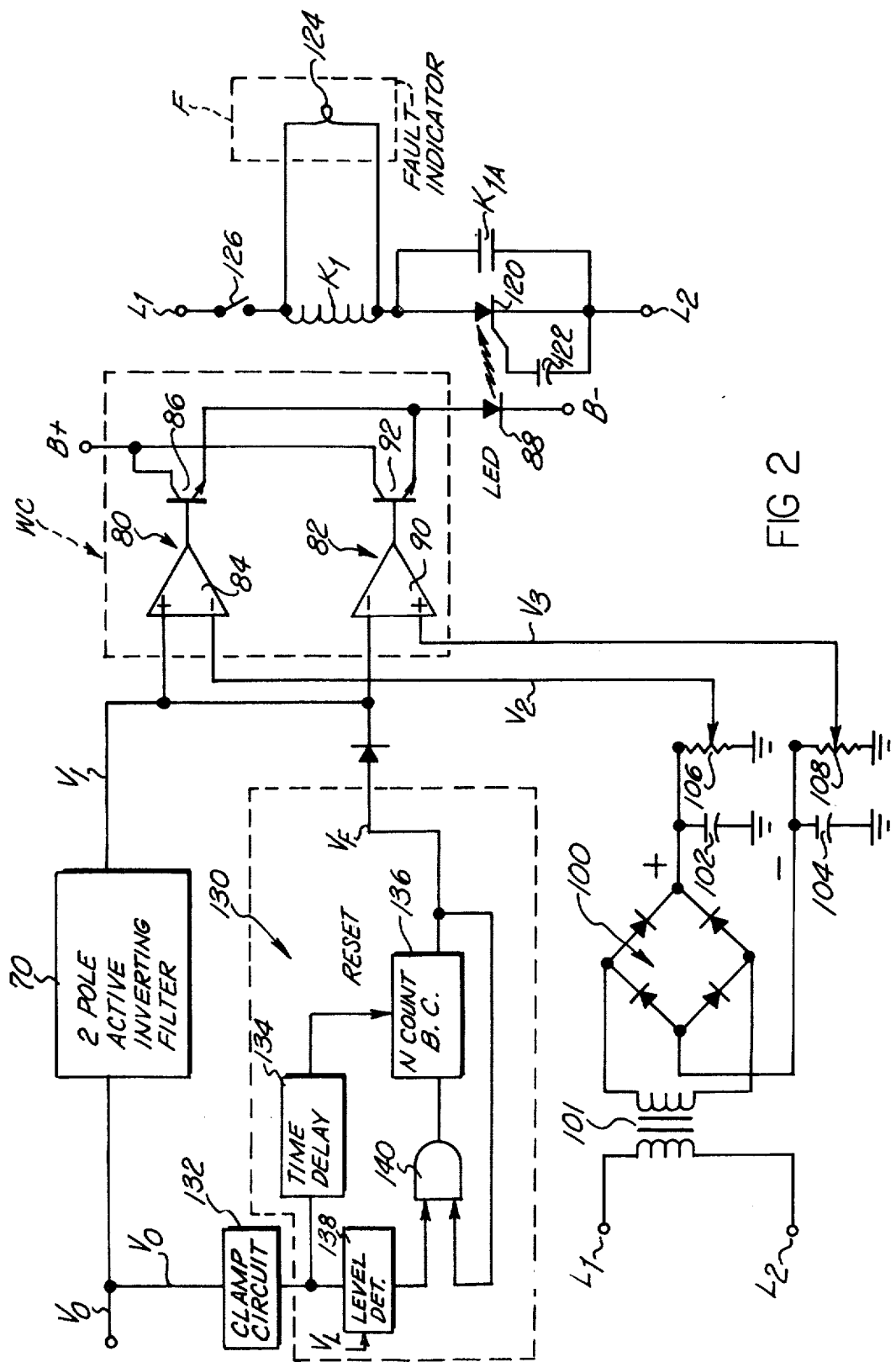
FIG. 2 is a combined schematic-block diagram illustration showing an improved DC fault detector circuit, a ground fault detector circuit, and a fault indicator control circuit incorporating the present invention.

The window comparator WC as depicted in FIG. 2 includes an upper limit comparator 80 and a lower limit comparator 82. The upper limit comparator includes an operational amplifier 84 having its noninverting input connected to receive output signal $V_1$ and its inverting input connected to receive an upper limit reference voltage $V_2$. The output of the amplifier is connected to the base of an NPN transistor 86, having its collector connected to a source of B+ potential and its emitter connected through a light emitting diode (LED) 88, and thence, to a source of B− potential. The lower limit comparator 82 is similar to comparator 80 and includes an operational amplifier 90 having its inverting input connected to receive output voltage signal $V_1$ and its noninverting input connected to receive a lower limit reference voltage $V_3$. The output of amplifier 90 is connected to the base of an NPN transistor 92, having its collector connected in common with the collector of transistor 86 to the B+ voltage supply source and its emitter connected in common with the emitter of transistor 86, and thence, through the light emitting diode 88 to the B− voltage supply source. Reference voltage $V_2$ is a positive level DC signal whereas reference voltage $V_3$ is a negative level DC signal. Consequently, if voltage signal $V_1$ is more positive than that of reference voltage $V_2$, then the output of operational amplifier 84 will become positive to gate transistor 86 into conduction, thereby energizing the light emitting diode 88. Similarly, if voltage signal $V_1$ is more negative than reference voltage $V_3$, then the output of the amplifier 90 will become positive to gate transistor 92 into conduction, thereby energizing light emitting diode 88. This, then, provides a window effect so that a range of DC voltages, above and below DC ground level, are permissible and only those potentials exceeding the window levels will result in energization of the light emitting diode.

The reference voltages $V_2$ and $V_3$ are derived from an unregulated DC supply so that the reference voltages are slaved to the line voltage. This will cause the trip level of a given fault to be independent of fluctuations in the line voltage. As shown in FIG. 2, this is obtained by connecting a full wave bridge circuit 100 through a transformer 101 directly across the AC voltage lines $L_1$ and $L_2$ to obtain positive and negative full wave rectified DC signals which are smoothed somewhat by capacitors 102 and 104 and applied across potentiometers 106 and 108, respectively. The high level or positive reference voltage $V_2$ is obtained from the wiper arm of potentiometer 106 whereas the low level or negative reference voltage $V_3$ is obtained from wiper arm of potentiometer 108. Since there is no voltage regulation involved, these reference voltages $V_2$ and $V_3$ will vary in magnitude with fluctuations in the AC line voltage. The surge voltage is also drawn directly from the AC line by transformer 24 without voltage regulation and, hence, the surge voltages and the corresponding DC fault voltage, at the junction of windings 10 and 12, will also vary in direct proportion to the line voltage. Consequently then, slaving the reference voltages $V_2$ and $V_3$ from the line voltage will cause the window comparator references to vary in direct proportion to the line voltage and thereby effectively cancel the effect of line voltage fluctuations. This follows because the window comparator responds to the ratio of the DC voltage $V_1$ and the comparator reference voltage $V_2$ or $V_3$ and not their absolute values.

As described above, if a fault condition be detected, the light emitting diode 88 is energized. This will illuminate a light activated silicon controlled rectifier 120, causing it to conduct and energize relay coil $K_1$ connected in series with the rectifier across the AC voltage lines $L_1$ and $L_2$. The circuit connections are such, however, that the silicon controlled rectifier 120 will conduct only during one half cycle of the AC signal and the polarities are such that this conduction will take place only during the positive half cycles. Consequently, during the half cycles that a surge voltage is applied, the silicon controlled rectifier is reversed biased preventing misfiring due to noise which may result from the surge voltage. A capacitor 122 provides noise filtering to increase the noise immunity of the light activated SCR. Once the silicon controlled rectifier is gated into conduction, during a positive half cycle of the AC line voltage, the relay coil $K_1$ becomes energized and, in turn, causes its normally open contacts $K_{1n}$ to close. This completes a holding circuit across the silicon controlled rectifier to maintain the relay energized during both half cycles of the AC voltage source. A suitable lamp 124 serves as a fault indicator and becomes energized once a circuit is completed between the AC lines $L_1$ and $L_2$. After the fault condition has been noted by the operator, suitable circuitry is operated to provide a reset function. This may be represented by a simple, normally closed switch 126 which is opened to break the relay circuit.

The description thus far has dealt with DC faults which are normal winding unbalances due to shorted turns, overwound turns, underwound turns, or an open circuit. The other class of faults detected by the circuitry herein is caused by a ground fault, wherein a portion of the test winding or the standard winding comes into contact with its core. This type of fault contemplates that a conductive core be present and in the test, standard winding 10 is associated with a conductive core 11 and test winding 12 is associated with a conductive core 13. In normal use, these cores are electrically connected to ground. An existing connection may be present between the core and its associated winding or the connection may be such that it can be detected by the application of a surge pulse. When a surge voltage is applied to the windings 10 and 12, a ground fault will result in a damped oscillation at the summing junction 15. This oscillation is illustrated as output signal $V_{o'}$ in FIG. 3c from which it is seen that the voltage signal is a damped oscillation, symetrical about zero volts. The oscillatory condition is created by the existence of the parallel resonant circuit of a portion of the faulted winding and the capacitor 58. However, because of the symmetry as seen in FIG. 3c, the average DC value of the signal is essentially zero and, hence such a fault is not detectable by the DC meter M1 or by obtaining a DC average signal, as with the use of filter 70. The existence of this type of fault can be measured with the use of an oscilliscope. This would not lend itself to production line testing and would require the use of a trained operator. In accordance with the present invention, such a ground fault oscillatory signal $V_{o'}$ is applied to a ground fault detecting circuit 130 which serves to provide an output signal voltage $V_f$ of sufficient magnitude to cause the window comparator WC to energize the light emitting diode as a function of whether the number of pulsations of the ground fault signal $V_{o'}$ exceeds a prescribed limit within a given period of time. In the example given, it has been determined that a no-go signal should be provided by the fault indicator F in the event the ground fault detector detects at least four positive pulsations, each exceeding a reference level $V_L$, during a line voltage cycle.

Referring now to the circuitry illustrated in FIG. 2, a ground fault signal $V_{o'}$ is applied to a clamping circuit 132 which serves to limit the maximum level of each pulsation to a prescribed level to prevent damage to the succeeding logic circuitry. The first positive pulsation taken from the clamping circuit actuates a time delay circuit 134 which serves to time a time duration $T_2$ which is slightly less than the line cycle length time duration $T_1$ between successive firing points 50. This time duration then, is on the order of 12 milliseconds. During this time duration an N count binary counter 136 operates to count the number of positive pulsations of the ground fault signal $V_{o'}$. In the example given, four pulsations must be counted during the time period $T_2$ for the condition to be considered a fault condition and cause energization of the light emitting diode 88. At the end of completing its timing function, the time delay circuit 134 provides a reset signal to reset the counter 136 to a zero count condition. The time delay circuit may take any suitable form for providing this function and, for example, may be the equivalent of an RS flip-flop for receiving pulses from the clamping circuit together with an RC timer which, taken together, serve in response to receipt of the first pulse to provide a time delay of a desired duration, such as 12 milliseconds, and then provide a reset output signal to reset the binary counter. Counter 136 may take any suitable form of known resettable binary counters. The pulses from the clamping circuit 132, to be recognized, must exceed a desired magnitude such as the reference level $V_L$. This may be implemented with the use of a level detector 138 which serves to pass those positive pulsations which exceed voltage level $V_L$. These positive pulses are then applied to a normally enabled gate, such as NOR gate 140, and are then passed to the input of the counter 136. The feedback path from the counter to the input of the NOR gate serves to disable the counter once output voltage $V_f$ is obtained and thereby prevent the counting of additional pulses during the line voltage cycle. The time delay circuit will, in any event, continue its timing function to reset the counter to its zero status once it has completed timing the time period $T_2$.

During operation, the first positive pulse, greater than the voltage level $V_L$, received by the circuitry of FIG. 2 will cause counter 136 to increment to a decimal count of 1. If the input signal be representative of a normal DC fault (see the waveform of FIG. 3b), then there will be only one pulsation greater than the voltage level $V_L$ during time period $T_2$. Consequently then, the DC fault signal will be processed in the manner as described hereinbefore wherein an average DC signal $V_1$ is applied to the window comparator. The time delay circuit 134 will complete its timing of the time period $T_2$ and reset counter 136. If however, a ground fault is present, the pulsations of the ground fault signal $V_{o'}$ will be counted providing each pulsation exceeds the voltage level $V_L$. Once four pulses have been counted, the counter provides an output voltage $V_f$ of sufficient magnitude to cause the window comparator WC to energize the light emitting diode 88. In the manner described before, this will cause energization of the fault indicator lamp 124.

Whereas the invention has been described with respect to a preferred embodiment, it is to be appreciated that the invention is not limited thereto as various modifications in components and method steps may be made without departing from the spirit and scope of the invention as defined by the appended claims.

What is claimed is:

1. A surge tester for testing an electrical winding comprising:
   means for respectively applying first and second surge voltage pulses to a test winding and a standard winding,
   surge voltage generating means for developing said surge voltage pulses from an AC voltage source such that the magnitude of a said voltage pulse is proportional to the magnitude of said AC voltage source, said AC voltage source being an AC line voltage source and said surge voltage generating means including means for developing said surge voltage pulses from said AC line voltage source so that the magnitude of a said surge voltage pulse is proportional to the peak value of said AC line voltage source;

output circuit means connected to said test and standard windings for providing a difference voltage exhibiting a magnitude representative of any difference in the voltages developed across said windings in response to application of the first and second surge voltage pulses thereto;

fault detector means including means for comparing any said difference voltage with a reference voltage and providing an output signal in dependence upon said comparison; and, circuit means for providing a said reference voltage derived from a said AC voltage source with said reference voltage having a magnitude which varies in proportion to variations in the magnitude of said AC voltage source.

2. A surge tester as set forth in claim 1 wherein said surge voltage generating means includes first and second capacitors and capacitor charging means for connection with said AC line voltage source for charging said first and second capacitors to equal voltages of magnitudes proportional to the peak magnitude of said AC line voltage source.

3. A surge tester as set forth in claim 2 including first and second capacitor discharge switching means for applying said first and second surge voltage pulses from said respective capacitors to said test and standard windings.

4. A surge tester as set forth in claim 3 including switch control means for actuating said first and second switch means to simultaneously apply said first and second surge voltage pulses to said test and standard windings.

5. Apparatus as set forth in claim 1, wherein said comparing means includes first and second comparing means for comparing said difference voltage with a high level reference voltage and a low level reference voltage, and said reference voltage providing means includes means for providing said first and second reference voltages so as to exhibit magnitudes which vary in proportion to variations in the magnitude of said AC voltage source.

6. Apparatus as set forth in claim 1 wherein said fault detector means includes ground fault detector means for providing a ground fault indication when said difference voltage is oscillatory as a function of a given number of pulsations thereof within a given period of time.

* * * * *